Oct. 12, 1948.   H. J. KENT   2,451,342
GEAR MOUNTING
Filed June 7, 1947
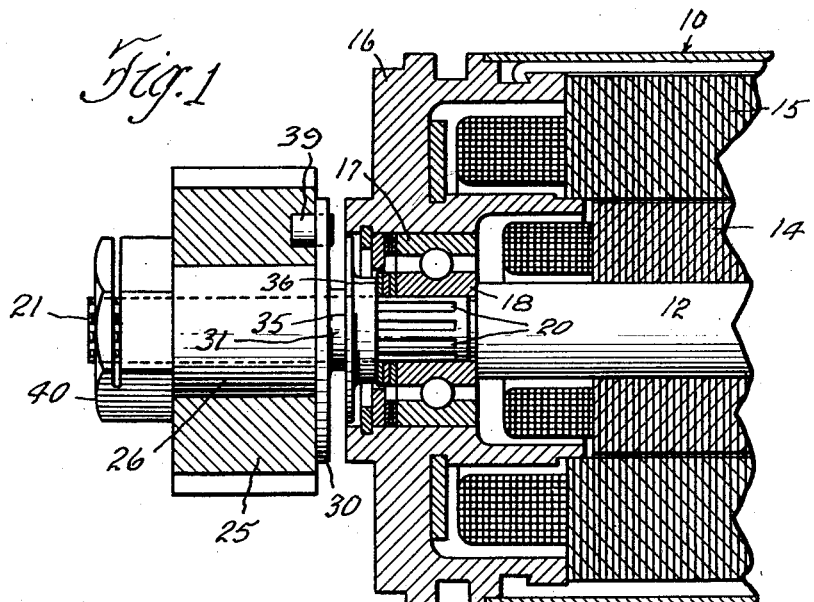
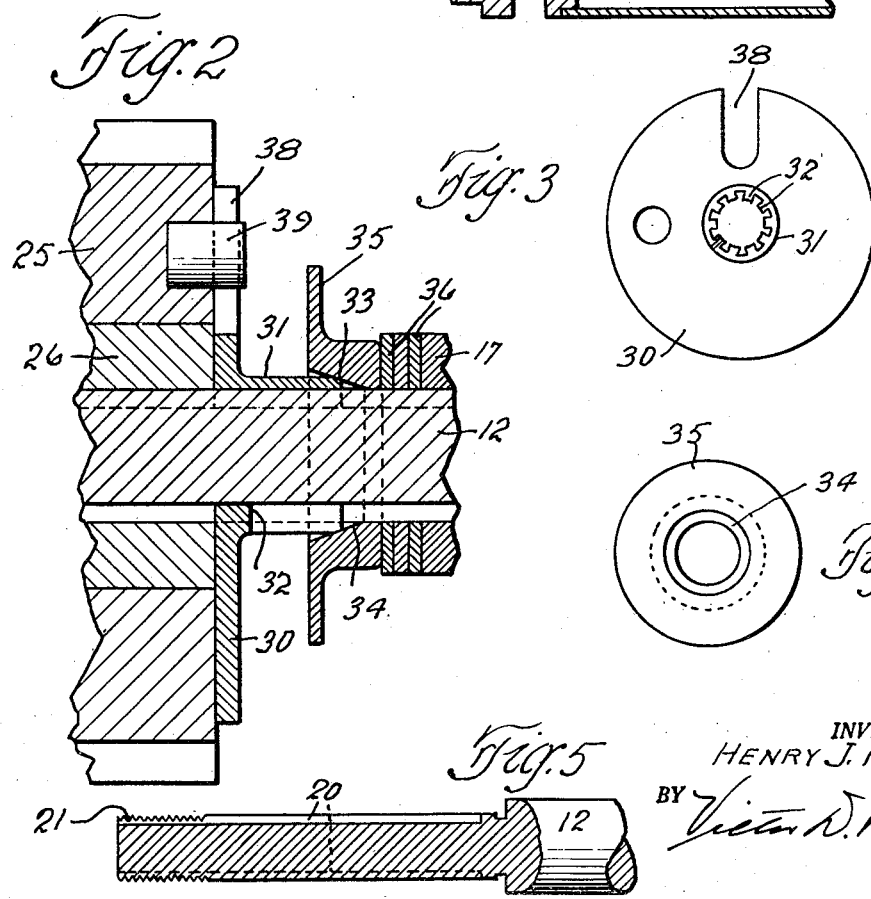
INVENTOR.
HENRY J. KENT Patented Oct. 12, 1948

2,451,342

UNITED STATES PATENT OFFICE 2,451,342

GEAR MOUNTING

Henry J. Kent, Teaneck, N. J., assignor to Kearfott Company, Inc., New York, N. Y., a corporation of New York Application June 7, 1947, Serial No. 753,334

6 Claims. (Cl. 287—53)

This invention relates to mechanism for mounting a gear on a shaft and more particularly to a gear mounting for use on shafts of small motors or synchros which are required to operate with extreme accuracy.

An object of the invention is to provide a gear mounting of the above type which eliminates eccentricity and back-lash in parts which are made with commercial tolerances.

Another object is to provide a mounting of the above type in which the gear may be readily attached to or removed from the shaft.

Another object is to provide a mounting of the above type which does not greatly increase the cost of manufacture and which simplifies the assembly of the gear on the shaft.

Various other objects and advantages will be apparent as the nature of the invention is more fully disclosed.

In mounting small gears on the shafts of small motors or synchros such as those used in electrical follow-up systems, it has been customary to make the gear to fit the shaft as accurately as commercial tolerances permit and to secure the same to the shaft by a key and keyway. It has been found, however, that in such assemblies a certain amount of back-lash may be present. This back-lash may not be appreciable in the case of large gears and shafts, but is unacceptable in cases of the type above referred to where extreme accuracy is required. It has also been proposed to provide a gear with a split hub which is clamped about the shaft. This construction, however, has been found to produce a certain amount of eccentricity. Hence this type of securing means is likewise unacceptable where extreme accuracy is required.

In accordance with the present invention these difficulties are overcome by providing a splined shaft on which the gear is accurately journalled for concentricity. A driving disk having a split projecting hub is mounted on the splined shaft and is provided with keys or teeth which enter the splines for securing the disk for rotation with the shaft. The hub is provided with a tapered end surface which engages a conical inner surface of a cooperating element for compressing the split hub and clamping the same securely to the shaft. The disk is then pinned to the gear and provides a positive drive in which all back-lash has been effectively eliminated. Inasmuch as the gear is journalled on the shaft independently of the driving disk the concentricity of the gear is not affected by the clamping of the split hub of the disk to the shaft. Hence both eccentricity and back-lash are eliminated.

Although the novel features which are characteristic of this invention are pointed out more particularly in the claims, the nature of the invention will be better understood by referring to the following description, taken in connection with the accompanying drawing in which a specific embodiment thereof has been set forth for purposes of illustration.

In the drawing:

Fig. 1 is a partial section through a motor, on an enlarged scale, showing a gear mounting embodying the present invention;

Fig. 2 is a partial sectional view through a portion of the gear, the driving disk and the clamping ring on a larger scale;

Fig. 3 is a front elevation of the driving disk;

Fig. 4 is a front elevation of the clamping ring; and

Fig. 5 is a detail view, partly in section, of the end of the shaft to which the gear is to be applied.

In the following description specific terms are used for convenience in referring to various details of the invention. It is to be understood, however, that these terms are to be interpreted as broadly as the state of the art will permit.

Referring to the drawings more in detail, the invention is shown as applied to a motor 10 having a shaft 12. The motor includes a rotor 14 of magnetic material carried by the shaft 12, a stator 15, and an end plate 16 carrying a bearing 17 in which the shaft 12 is journalled. The shaft 12 is shown as having a shoulder 18 bearing against the inner surface of the bearing 17 for positioning purposes. The motor is of standard construction and only as much thereof has been shown as is necessary to an understanding of the present invention.

The shaft 12 is provided with a plurality of axially extending splines or grooves 20 which extend from the position of the bearing 17 to the end of the shaft. At the end the shaft is provided with threads 21 which are formed over the splines 20.

In accordance with the present invention a gear 25 is accurately fitted on a sleeve 26 which in turn is accurately journalled on the shaft 12 to obtain concentricity between the gear 25 and the shaft 12. A driving disk 30 is provided with a projecting split hub 31 having teeth 32 which enter the various splines 20 on the shaft 12. The hub 31 is provided with a tapered end surface 33 which is adapted to engage the conical inner surface 34 of the clamping ring 35, bearing against shims 36 seated against the outer surface of the bearing 17. The disk 30 is provided with a radial slot 38 through which a pin 39 extends. The pin 39 is rigidly secured to the gear 25 and fits the slot 38 accurately to eliminate any back-lash. A lock nut 40 is threaded onto the thread 21 and clamps the gear 25, disk 30, ring 35 and bearing 17 against the shoulder 18 of the shaft 12. The lock nut 40 is adjusted to cause the conical surface 34 of the ring 35 to clamp the split hub 31 of the disk 30 rigidly to the shaft 12. The ring 35 may seat against a shoulder or stop on the shaft 12 instead of against the bearing 17 if desired.

For assembling the gear 25 on the shaft 12 it is only necessary to first position the ring 35 against the bearing 17, providing shims 36 if necessary to suitably position the ring 35. The disk 30 is then positioned on the shaft 12 and the gear 25 and sleeve 26 are located against the disk 30 with the pin 39 extending through the slot 38 of the disk 30. The lock nut 40 is then applied over the threads 21 and is tightened for clamping purposes.

It will be noted that the axial thrust produced by the nut 40 causes the ring 35 to clamp the split hub 31 of the disk 30 securely to the shaft 12. The hub 31 is tightened in this manner to a point at which no back-lash occurs. The concentricity of the disk 30 is unimportant inasmuch as the slot 38 provides the necessary clearance for the pin 39. The pin 39 is machined to fit accurately within the slot 38 so that no back-lash occurs at that point.

It will be noted that the above construction is simple and that the parts may be readily assembled or dismantled. It is particularly adapted to use in connection with small shafts and gears where extreme accuracy is required. A motor has been shown for illustration only. The shaft 12 may be connected to a synchro or other rotary device.

Although a specific embodiment has been shown for purposes of illustration, it is to be understood that the invention is only to be limited in accordance with the scope of the following claims.

What is claimed is:

1. A gear assembly comprising a rotatable shaft having a series of axially extending splines formed therein, a gear journalled on said shaft, a driving disk for said gear having a projecting split hub formed with teeth registering with said splines, clamping means contracting the split hub to secure the same rigidly to said shaft, and a member connecting said disk to said gear.

2. A gear assembly comprising a rotatable shaft having a series of axially extending splines formed therein, a gear journalled on said shaft, a driving disk for said gear having a projecting split hub formed with teeth registering with said splines, clamping means contracting the split hub to secure the same rigidly to said shaft, a radial slot in said disk and a pin carried by said gear and seating in said slot for driving said gear.

3. A gear assembly comprising a rotatable shaft having a series of axially extending splines formed therein, a gear journalled on said shaft, a driving disk for said gear having a projecting split hub formed with teeth registering with said splines and having a tapered end surface, a clamping ring having a conical inner surface engaging said tapered surface, means exerting axial pressure on said surfaces to contract said hub and secure the same rigidly to said shaft, and a member connecting said disk to said gear.

4. A gear assembly comprising a rotatable shaft having a series of axially extending splines formed therein, a gear journalled on said shaft, a driving disk for said gear having a projecting split hub formed with teeth registering with said splines and having a tapered end surface, a clamping ring having a conical inner surface engaging said tapered surface, and a stop and nut on said shaft clamping said gear, disk and ring together.

5. A gear assembly comprising a rotatable shaft having a series of axially extending splines formed therein, a gear journalled on said shaft, a driving disk for said gear having a projecting split hub formed with teeth registering with said splines and having a tapered end surface, a clamping ring having a conical inner surface engaging said tapered surface, a stop and nut on said shaft clamping said gear, disk and ring together, a radial slot in said disk, and a pin carried by said shaft entering said slot to secure said gear in driving relationship.

6. A gear assembly comprising a rotatable shaft having a series of axially extending splines formed therein, a gear journalled on said shaft over said splines, a driving disk for said gear having a projecting split hub formed with teeth registering with said splines and having a tapered end surface, a clamping ring having a conical inner surface engaging said tapered surface, stop means on said shaft, a nut threaded on said shaft over said splines to clamp said gear, disk and ring against said stop means for contracting said hub and rigidly securing the same to said shaft, and a member connecting said disk to drive said gear.

HENRY J. KENT.

REFERENCES CITED

The following references are of record in the file of this patent:

UNITED STATES PATENTS

| Number | Name | Date |
|---|---|---|
| 101,824 | Clark | Apr. 12, 1870 |
| 173,126 | Little | Feb. 8, 1876 |
| 1,407,568 | Page | Feb. 21, 1922 |
| 1,511,910 | Royce | Oct. 14, 1924 |
| 2,270,583 | Forton | Jan. 20, 1942 |